(12) United States Patent
Way et al.

(10) Patent No.: US 7,133,392 B1
(45) Date of Patent: *Nov. 7, 2006

(54) AUTONOMOUS MULTI-SERVICES CARD

(75) Inventors: Bryan George Way, Overland Park, KS (US); Bryan Lee Gorman, Mission, KS (US); Robert Walter Plamondon, Olathe, KS (US); David Allison Rush, Merriam, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1069 days.

This patent is subject to a terminal disclaimer.

(21) Appl. No.: 10/006,406

(22) Filed: Nov. 30, 2001

Related U.S. Application Data

(62) Division of application No. 09/197,044, filed on Oct. 12, 1999.

(51) Int. Cl.
*H04Q 7/24* (2006.01)
*H04L 12/28* (2006.01)
*H04L 12/56* (2006.01)

(52) U.S. Cl. ..................... 370/338; 370/401
(58) Field of Classification Search ............... 370/401, 370/463, 466, 420, 421, 464, 465, 352, 355, 370/356, 419, 395.1; 709/249, 250, 227, 709/232, 238, 200
See application file for complete search history.

(56) References Cited

U.S. PATENT DOCUMENTS

| | | | |
|---|---|---|---|
| 5,734,656 A | 3/1998 | Prince et al. | 370/401 |
| 5,737,333 A | 4/1998 | Civanlar et al. | 370/352 |
| 5,781,549 A | 7/1998 | Dai | 370/398 |
| 5,881,142 A | 3/1999 | Frankel et al. | 379/167 |
| 5,892,764 A * | 4/1999 | Riemann et al. | 370/401 |
| 5,963,620 A | 10/1999 | Frankel et al. | 379/93.05 |
| 6,075,784 A | 6/2000 | Frankel et al. | 370/356 |
| 6,128,293 A | 10/2000 | Pfeffer | 370/359 |
| 6,141,339 A | 10/2000 | Kaplan et al. | 370/352 |
| 6,208,658 B1 | 3/2001 | Pickett | 370/401 |
| 6,272,553 B1 * | 8/2001 | Way et al. | 709/250 |
| 6,343,079 B1 * | 1/2002 | Way et al. | 370/401 |
| 6,681,259 B1 * | 1/2004 | Lemilainen et al. | 709/250 |
| 6,735,208 B1 * | 5/2004 | Riemann et al. | 370/401 |
| 2003/0145119 A1 * | 7/2003 | Bender et al. | 709/249 |
| 2005/0174990 A1 * | 8/2005 | Riemann et al. | 370/352 |

OTHER PUBLICATIONS

The PacComm '320' Series Dual-modem HF/VHF Packet Controller: www.paccomm.com.
The Residential Gateway Functional Specifications: www.interactivehg.org/councils/html2/feigel/webspec.htm.

* cited by examiner

*Primary Examiner*—Chirag G. Shah

(57) ABSTRACT

An autonomous multi-services card provides internal control over communications, so that host computer control input is not required. Communications performance is improved, especially for real time communications such as telephone conversations, because the autonomous multi-services card does not wait on late or failed control input from the host computer. The autonomous multi-services card is comprised of a communications processing system connected to a network interface, telephone interface, video interface, and computer interface. The communications processing system controls: 1) the exchange of voice signals with a telephone connection, 2) the exchange of video signals with a video connection, 3) the exchange of data with a host computer connection, and 4) the exchange of the data, video signals, and voice signals with a network connection.

21 Claims, 5 Drawing Sheets

AUTONOMOUS MULTI-SERVICES CARD

RELATED APPLICATIONS

This is a divisional application of co-pending U.S. patent application Ser. No. 09/197,044, filed Oct. 12, 1999, hereby incorporated by reference in its entirety.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of communications, and in particular, to an autonomous multi-services card that connects to a host computer and a telephone device to a communications network.

2. Statement of the Problem

A network interface card fits into the slot of a host computer. The network interface card allows the host computer to communicate with a communications network. Typically, the host computer provides control input to the network interface card. Unfortunately, communications performance is adversely affected by using the host computer to control the network interface card.

The host computer typically executes an operating system and a variety of software applications. Thus, host computer processing time is shared across multiple software components. Communications performance suffers as a result because the host computer may not provide control input to network interface card in a timely manner. Since many forms of communication are real-time in nature, such as a telephone conversation, the lack of timely host computer control can severely disrupt communications. In addition one of the software applications may cause the host computer to crash, so that no control input is provided to the network interface card. In this case, communications would cease altogether.

SUMMARY OF THE SOLUTION

The invention solves the above problem with an autonomous multi-services card that can fit into the slot of a computer, but that provides internal control over communications so that host computer control input is not required. Communications performance is improved, especially for real time communications such as telephone conversations, because the autonomous multi-services card does not wait on late or failed control input from the host computer.

The autonomous multi-services card is comprised of a communications processing system connected to a computer interface, telephone interface, network interface, and video interface. The computer interface is coupled to a host computer by a host computer connection and exchanges data with the host computer connection. The telephone interface is connected to a telephone device by a telephone connection and exchanges voice with the telephone connection. The video interface is coupled to a video device by a video connection and exchanges video signals with the video connection. The network interface is connected to a communications network by a network connection and exchanges the data, video signals, and voice signals with the network connection.

The communications processing system controls: 1) the exchange of voice signals with the telephone connection, 2) the exchange of video signals with the video connection, 3) the exchange of data with the host computer connection, and 4) the exchange of the data, video signals, and voice signals with the network connection. Communication paths connect the communications processing system with the computer interface, the telephone interface, the network interface, and the video interface.

The autonomous multi-services card is comprised of a substrate that is connected to the computer interface, the telephone interface, the network interface, the video interface, the communications processing system, and the communication paths. The substrate physically attaches to a slot in the host computer. The host computer connection typically includes a contact/socket type connection.

It should be noted that although the autonomous multi-services card may receive power from the host computer connection, the communications processing system can control the exchange of voice or video signals without any control input from the host computer. This represents a distinct advantage over prior systems that rely on the host computer for control input. In these prior systems, communications between the telephone device and the communications network would suffer or fail if the control input from the host computer was delayed.

DETAILED DESCRIPTION OF THE INVENTION

Figure 1:
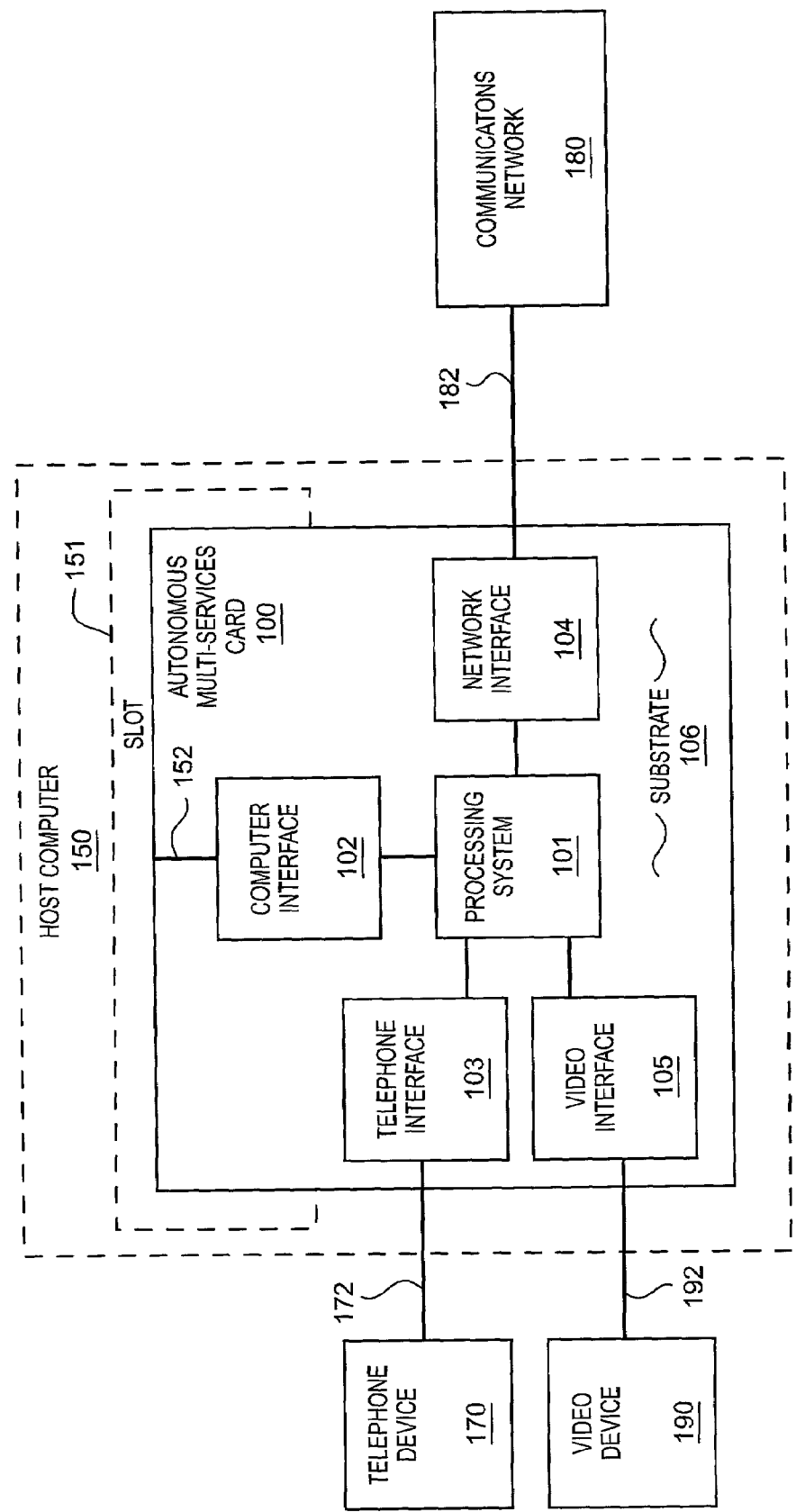
FIG. 1 is a block diagram of an autonomous multi-services card configuration and environment in an example of the invention.

Autonomous Multi-Services Card Configuration and Environment—FIG. 1

FIG. 1 depicts an autonomous multi-services card 100. The autonomous multi-services card 100 is comprised of a communications processing system 101, computer interface 102, telephone interface 103, network interface 104, and video interface 105. Communication paths connect the communications processing system 101 to the computer interface 102, the telephone interface 103, the network interface 104, and the video interface 105. Those skilled in the art will recognize that some conventional elements of the autonomous multi-services card 100 have been omitted for clarity.

The autonomous multi-services card 100 is comprised of a substrate 106 that is connected to the communications processing system 101, computer interface 102, telephone interface 103, network interface 104, the video interface 105, and the respective inter-connecting communication paths. The substrate 106 physically attaches to the host computer 150 by fitting into a slot 151 in the host computer 150. Computer card substrates that physically attach within host computer slots are well known.

The computer interface 102 is coupled to a host computer 150 by a host computer connection 152. The host computer connection 152 typically includes a contact/socket type connection. The telephone interface 103 is connected to a telephone device 170 by telephone connection 172. The network interface 104 is connected to a communications network 180 by a network connection 182. The video interface 105 is coupled to a video device 190 by a video connection 192. If desired, the telephone connection 172 and the video connection 192 could be the same physical connection, and the telephone interface 103 and the video interface 105 could be integrated together.

The computer interface 102 could be any circuitry and logic that can be coupled to the host computer connection 152 and that exchanges data with the host computer connection 152. The telephone interface 103 could be any circuitry and logic that can be coupled to the telephone connection 172 and that exchanges voice signals with the telephone connection 172. The video interface 105 could be any circuitry and logic that can be coupled to the video connection 192 and that exchanges video signals with the video connection 192. The network interface 104 could be any circuitry and logic that can be coupled to the network connection 182 and that exchanges the data, video signals, and voice signals with the network connection 182. The communications processing system 101 could be any circuitry and logic that controls: 1) the exchange of voice signals with the telephone connection 172, 2) the exchange of video signals with the video connection 192, 3) the exchange of data with the host computer connection 152, and 4) the exchange of the data, video signals, and voice signals with the network connection 182.

The host computer 150 communicates with the communications network 180 through the computer interface 102, the communications processing system 101, and the network interface 104. The telephone device 170 communicates with the communications network 180 through the telephone interface 103, the communications processing system 101, and the network interface 104. The video device 190 communicates with the communications network 180 through the video interface 105, the communications processing system 101, and the network interface 104.

It should be noted that although the autonomous multi-services card 100 may receive power from the host computer connection 152, the communications processing system 101 can control the exchange of voice or video signals without any control input from the host computer 150. This represents a distinct advantage over prior systems that rely on the host computer 150 for control input. In these prior systems, communications between the telephone device 170 and the communications network 180 would suffer or fail if the control input from the host computer 150 was delayed.

Figure 2:
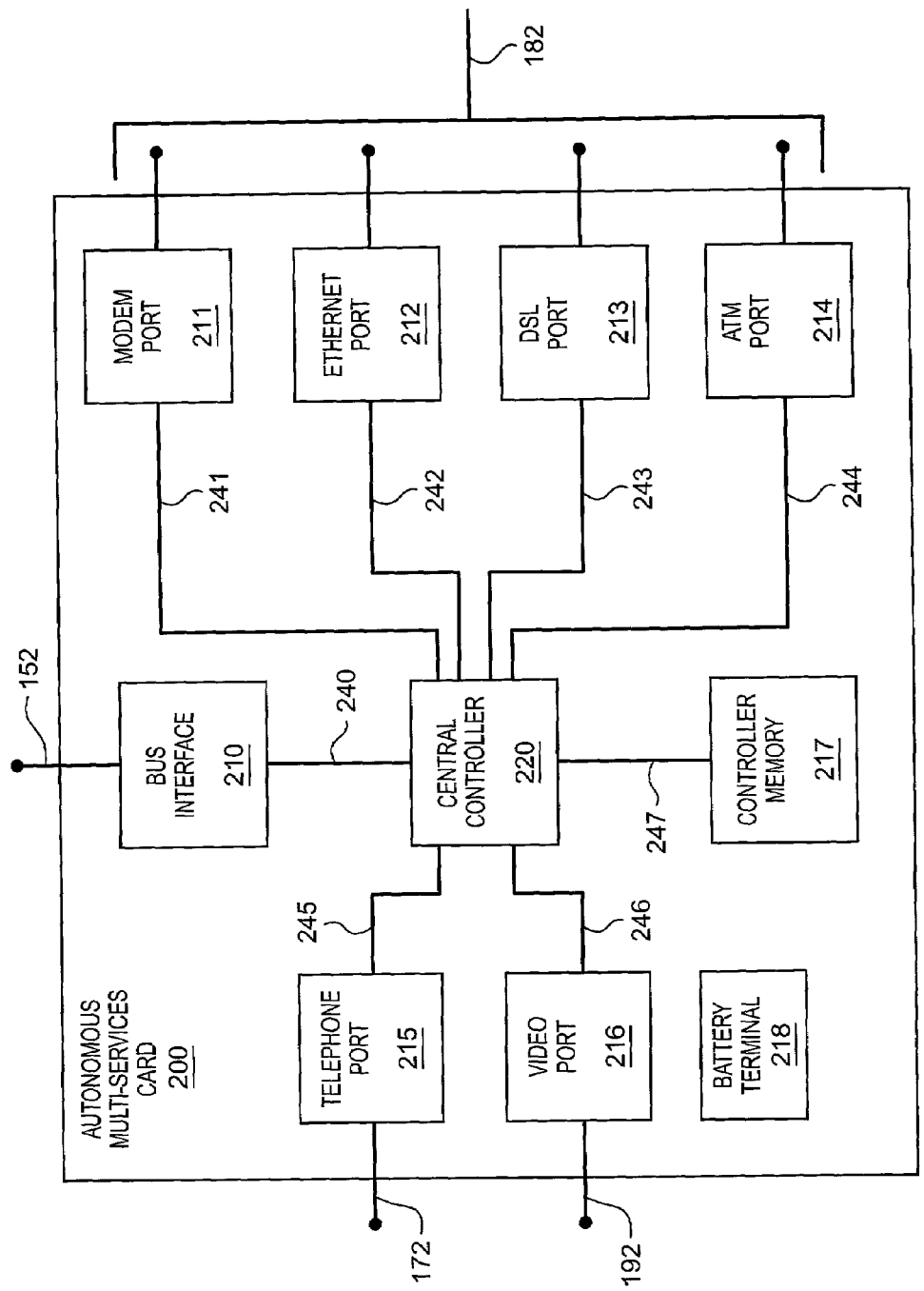
FIG. 2 is a detailed block diagram of an autonomous multi-services card configuration in an example of the invention.
Figure 3:
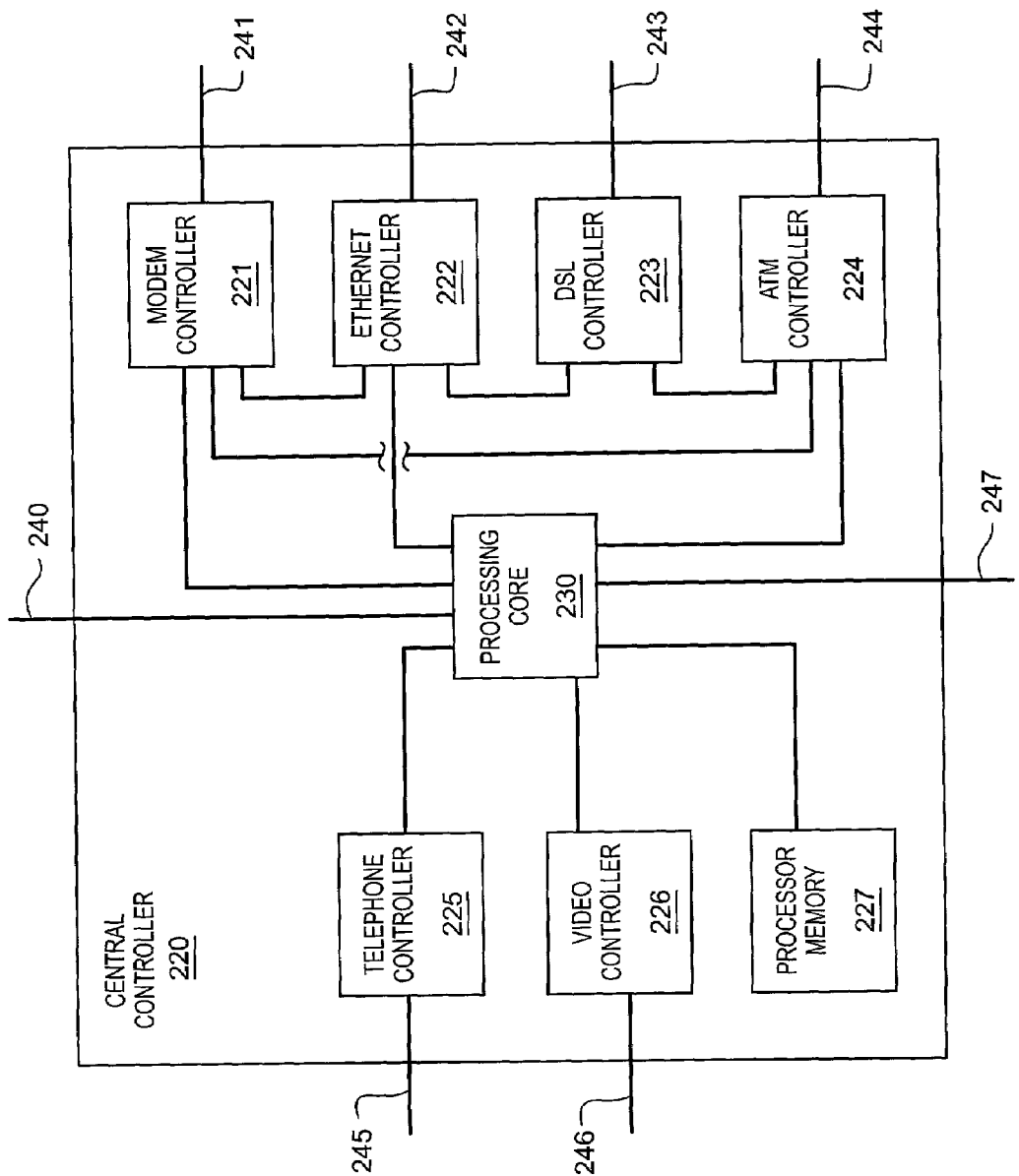
FIG. 3 is a detailed block diagram of an autonomous multi-services card central controller in an example of the invention.
Figure 4:
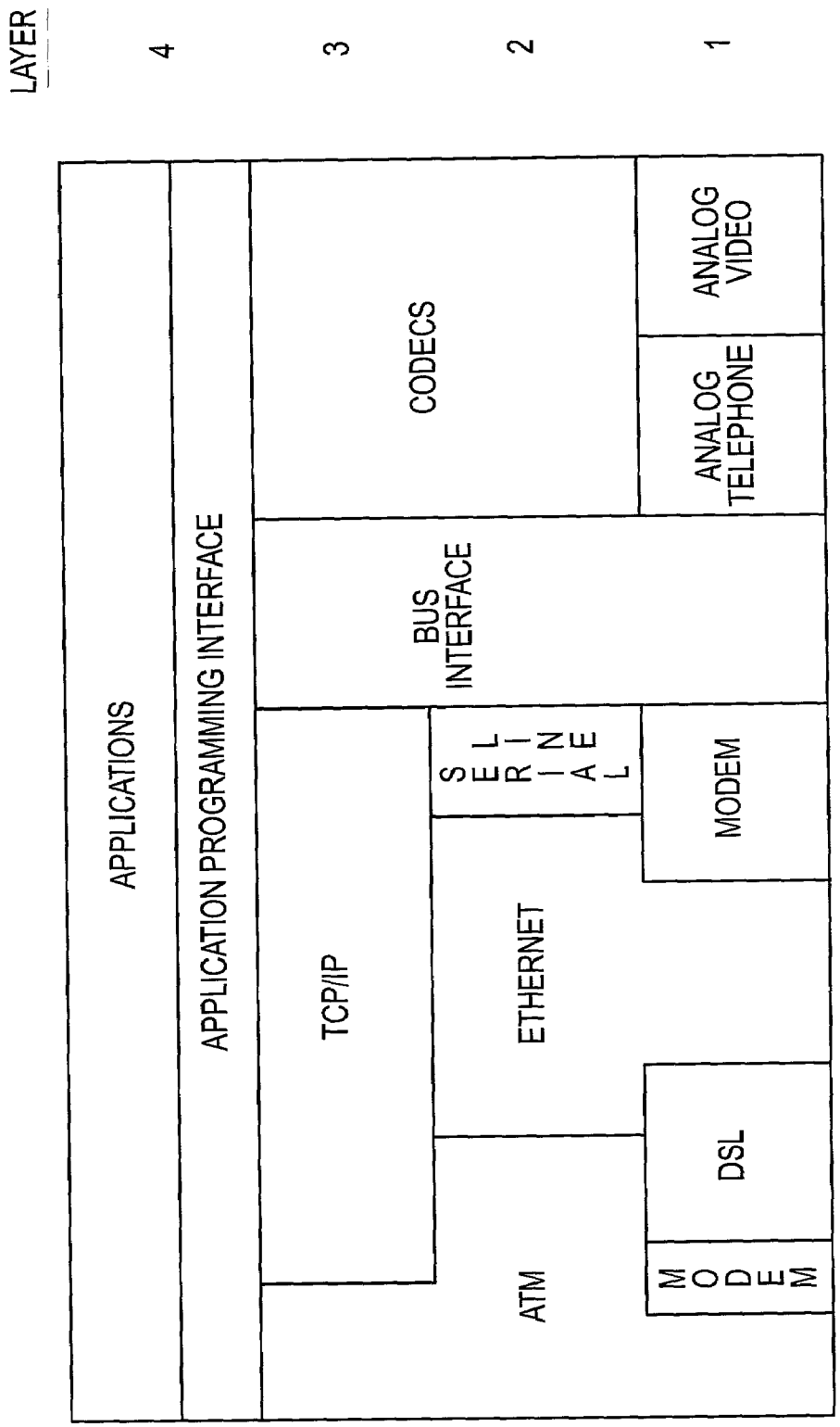
FIG. 4 illustrates a protocol stack used by the autonomous multi-services card in an example of the invention.

Specific Autonomous Multi-Services Card Implementation—FIGS. 2–4

FIGS. 2–4 depict a detailed example of an autonomous multi-services card. The invention is not restricted to this specific example, and is only restricted by the claims following this description. Those skilled in the art will appreciate that various features and functions described below can be combined with the invention as described above to provide multiple implementations of the invention.

FIG. 2 depicts an autonomous multi-services card 200. The autonomous multi-services card 200 is comprised of: bus interface 210, Modulator/Demodulator (modem) port 211, Ethernet port 212, Digital Subscriber Line (DSL) port 213, Asynchronous Transfer Mode (ATM) port 214, telephone port 215, video port 216, controller memory 217, battery terminal 218, and central controller 220. Each port 211–216 could be comprised of a single port or could include multiple ports of the type shown. Those skilled in the art will recognize that some conventional elements of the autonomous multi-services card 200 have been omitted for clarity.

The central controller 220 is connected to the bus interface 210 by a path 240. The central controller 220 is connected to the modem port 211 by a path 241. The central controller 220 is connected to the Ethernet port 212 by a path 242. The central controller 220 is connected to the DSL port 213 by a path 243. The central controller 220 is connected to the ATM port 214 by a path 244. The central controller 220 is connected to the telephone port 215 by a path 245. The central controller 220 is connected to the video port 216 by a path 246. The bus interface 210 can be coupled to the host computer connection 152. The network connection 182 can be coupled to the modem port 211, Ethernet port 212, DSL port 213, or ATM port 214. The telephone port 215 can be coupled to the telephone connection 172. The video port 216 can be coupled to the video connection 192.

The bus interface 210 could be a conventional interface, such as Ethernet, ATM, Universal Serial Bus (USB), Peripheral Component Interconnect (PCI), or Small Computer System Interface (SCSI). The modem port 211 could be conventional serial to an analog network, such as a telephony modem, RF cable modem, or RF wireless modem. The ports 212–216 could be conventional components for their respective protocol.

The autonomous multi-services card 200 receives power from the host computer connection 152 through the bus interface 210. Power could also be supplied from another source, such as a battery connected to the battery terminal 118. A battery power option is required if telephone service is desired when the host computer 150 is not fully operational, such as during a power outage to the host computer 150.

The central controller 220 allows the autonomous multi-services card 200 to operate autonomously from the host processor in the host computer 150. Thus, the autonomous multi-services card 200 does not require any control input from the host computer 150 to operate with robust functionality. The central controller 220 includes processing circuitry to execute software to control the exchange of various communications between the ports 211–216. Thus, communications can be exchanged from any of the ports 211–216 or the bus interface 210 to any of the other ports 211–216 or the bus interface 210. For example, a video device may communicate with a computer through the video port 216, central controller 220, and bus interface 210. Communications include modem, Ethernet, ATM, DSL, Transmission Control Protocol/Internet Protocol (TCP/IP), telephony, and video. The central controller 220, also controls the exchange of data through the bus interface 210. The controller memory 217 stores some of the software executed by the central controller 220.

FIG. 3 depicts the central controller 220. The central controller 220 is comprised of: a modem controller 221, Ethernet controller 222, DSL controller 223, ATM controller 224, telephone controller 225, video controller 226, processor memory 227, and processing core 230. Those skilled in the art will recognize that some conventional elements of the central controller 220 have been omitted for clarity.

The processing core 230 is connected to the modem controller 221, Ethernet controller 222, ATM controller 224, telephone controller 225, video controller 226, and processor memory 227. The modem controller 221 is connected to the Ethernet controller 222 and the ATM controller 224. The DSL controller 223 is connected to Ethernet controller 222 and the ATM controller 224. The modem controller 221 is connected to the path 241. The Ethernet controller 222 is connected to the path 242. The DSL controller 223 is connected to the path 243. The ATM controller 224 is connected to the path 244. The telephone controller 225 is connected to the path 245. The video controller 226 is connected to the path 246. The processing core 230 is connected to the path 240 and the path 247.

The controllers 221–226 are conventional circuitry that are operational to transfer communications in their respective protocols through their respective ports under the control of the central processing core 230. The controllers 221–224 include conventional auto-sensing functionality to process their own respective protocol and ignore other protocols. The telephone and video controllers 225–226 include digital signal processors that include coder/decoder (codec) functionality to convert between analog and digital signals. These digital signal processors also include functionality to provide compression and echo cancellation.

The processing core 230 includes circuitry to execute application software, typically stored in the processor memory 227 or controller memory 217. The processing core 230 directs the exchange of communications among the controllers 221–226 and the bus interface 210, and arbitrates access to the network 180. The processing core 230 also executes TCP/IP software to exchange communications in the TCP/IP format and provide a routing/bridging function. To support video, the processing core 230 implements the International Telecommunications Union H.321 and H.323 video-conferencing standards.

To support voice, the processing core 230 executes application software to implement Voice over IP and Voice over ATM standards. The processing core 230 responds to incoming and out-going calls by executing Telecommunications Information Network Architecture Consortium (TINA-C) Service Architecture Provider Agent application software. The telephone controller 225 provides an analog telephony interface to the path 245 under the control of the processing core 230. The analog telephony interface in the telephone controller 225 detects off-hook conditions, on-hook conditions, Multi-Frequency (MF) tones, and Dual Tone Multi-Frequency (DTMF) tones; and provides dial tone, ring current, ringback tones, busy tones, and other standard telephony signaling tones. An example of a provider agent and analog telephony interface is disclosed in U.S. patent application Ser. No. 09/128,944, entitled "Telecommunications Provider Agent", filed on Aug. 5, 1998, and which is hereby incorporated by reference into this application.

FIG. 4 depicts one example a protocol stack for the autonomous multi-services card 200.

The various mappings described below indicate the protocol combinations that can be used. At layer 1, ATM, modem, DSL, Ethernet, bus interface, analog telephone, and analog video are available. ATM, modem, and DSL layer 1 map to ATM layer 2. DSL layer 1 also maps to Ethernet layer 2. Ethernet layer 1 maps to Ethernet layer 2. Modem layer 1 also maps to Ethernet layer 2 and serial line layer 2. Bus interface layer 1 maps to bus interface layer 2. Analog telephone layer 1 and analog video layer 1 map to codecs layer 2.

At layer 2, ATM layer 2 maps to ATM layer 3 and TCP/IP layer 3. Ethernet layer 2 maps to TCP/IP layer 3. Serial line layer 2 maps to TCP/IP layer 3. Bus interface layer 2 maps to bus interface layer 3. Codecs layer 2 map to codecs layer 3. At layer 3, ATM, TCP/IP, bus interface, and codecs map to the Application Programming Interface (API) at layer 4.

The API layer 4 maps to the applications at layer 4. The API includes conventional API software for each layer 3 protocol. The applications at layer 4 include the software executed by the processing core 230.

It should be appreciated from the above description that the autonomous multi-services card 200 can handle voice, video, and data using a variety of communications protocols. Although the autonomous multi-services card 200 fits into a host computer slot, it is not dependent on the host computer for control input. The autonomous multi-services card 200 can handle video and telephone communications between a local telephone or video device and the communications network without any control input from its host computer. The autonomous multi-services card 200 can also handle data communications, including TCP/IP communications, between the host computer and the communications network.

Figure 5:
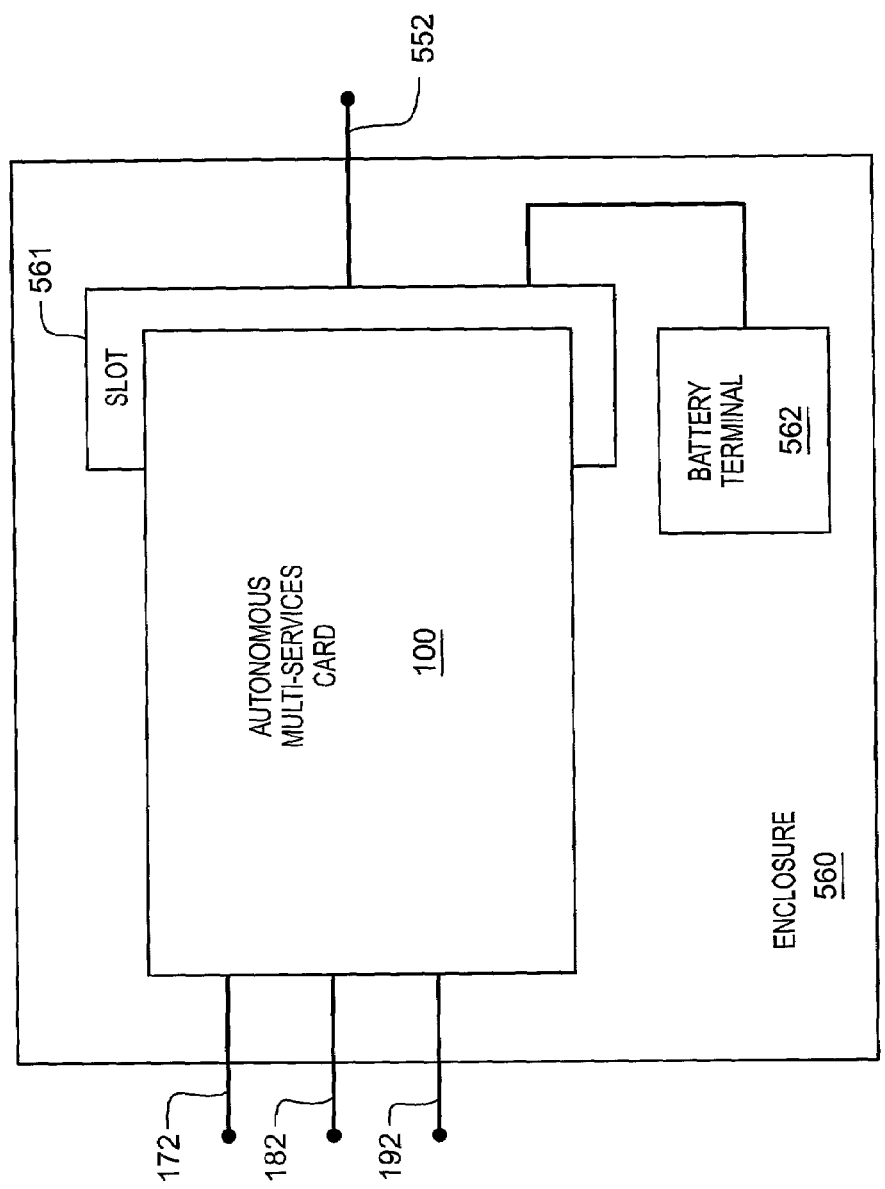
FIG. 5 is a block diagram of an autonomous multi-services card enclosure in an example of the invention.

Autonomous Multi-Services Card Enclosure—FIG. 5

FIG. 5 depicts the autonomous multi-services card 100 connected to the connections 172, 182, and 192 as in FIG. 1. Note that the autonomous multi-services card 100 is not physically attached to the slot 151 in the host computer 150. Instead, the autonomous multi-services card 100 is physically attached to a slot 561 in an enclosure 560. The slot 561 in the enclosure 560 and the slot 151 in the host computer 150 are both designed to emulate a standard computer slot for a network interface card. Thus, the autonomous multi-services card 100 is compatible with the slot 151, the slot 561, and a standard computer slot. The physical configuration of these types of slots is well known in the art.

The enclosure 560 could be a conventional plastic or metal box, such as the type typically used to house electronic components. The slot 561 is configured to connect the computer interface 102 on the autonomous multi-services card 100 to a host computer connection 552, such as a conventional SCSI or USB cable, that is connected to the host computer 150 (not shown). The slot 561 is configured to connect the computer interface 102 on the autonomous multi-services card 100 to a battery terminal 562 for an alternate power supply.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A computer comprising:
   a central processor;
   a memory electrically coupled to the central processor;
   a bus interface electrically coupled to the central processor, the bus interface comprising a slot; and
   an autonomous multi-services card at least partially inserted into the slot such that the autonomous multi-services card is in electronic communication with the bus interface, the autonomous multi-services card comprising:

a computer interface that is configured for coupling to the bus interface and that is operational to exchange data with the bus interface;

a telephone interface that is configured for coupling to a telephone connection and that is operational to exchange voice signals with the telephone connection;

a network interface that is configured for coupling to a network connection and that is operational to exchange the data and the voice signals with the network connection;

a communications processing system that is operational to control the exchange of the voice signals with the telephone connection and with the network connection without any control input from the central processor, and to control the exchange of the data with the bus interface and with the network connection;

communication paths that connect the communications processing system with the computer interface, the telephone interface, and the network interface; and a substrate that is configured for physical attachment to the slot and that is connected to the computer interface, the telephone interface, the network interface, the communications processing system, and the communication paths;

wherein the communications processing system operates independently of the central processor.

2. The computer of claim 1 wherein the network interface is further operational to exchange asynchronous transfer mode communications with the network connection and wherein the communications processing system is further operational to control the exchange of the asynchronous transfer mode communications with the network connection.

3. The computer of claim 1 wherein the network interface is further operational to exchange Ethernet communications with the network connection and wherein the communications processing system is further operational to control the exchange of the Ethernet communications with the network connection.

4. The computer of claim 1 wherein the network interface is further operational to exchange digital subscriber line communications with the network connection and wherein the communications processing system is further operational to control the exchange of the digital subscriber line communications with the network connection.

5. The computer of claim 1 wherein the network interface is further operational to exchange internet communications with the network connection and wherein the communications processing system is further operational to control the exchange of the internet communications with the network connection.

6. The computer of claim 1 wherein the computer interface is further operational to exchange internet communications with the bus interface and wherein the communications processing system is further operational to control the exchange internet communications with the bus interface.

7. The computer of claim 1 wherein the telephone interface is further operational to exchange analog telephone signals with the telephone connection and wherein the communications processing system is further operational to control the exchange of the analog telephone signals with the telephone connection.

8. The computer of claim 1 wherein the network interface is further operational to exchange modem communications with the network connection and wherein the communications processing system is further operational to control the exchange of the modem communications with the network connection.

9. The computer of claim 1 wherein the modem communications are cable modem communications.

10. The computer of claim 9 wherein the modem communications are wireless modem communications.

11. The computer of claim 9 wherein the modem communications are telephone modem communications.

12. The computer of claim 1 wherein the network interface is further operational to automatically sense the protocol used over the network connection.

13. The computer of claim 1 wherein the computer interface is further operational to receive power from the bus interface.

14. The computer of claim 1 further comprising a battery.

15. The computer of claim 1 further comprising a voice coder/decoder.

16. The computer of claim 1 wherein the telephone interface is operational to detect off-hook conditions, to detect on-hook conditions, to detect tones, to provide dial tone, to provide ring current, to provide ringback tones, and to provide busy tones.

17. The computer of claim 16 wherein the communications processing system is operational to control the telephone interface to generate and receive telephone calls.

18. The computer of claim 1 further comprising an enclosure, wherein the central processor, the memory, and die autonomous multi-services card are located within the enclosure.

19. The computer of claim 18 further comprising a battery.

20. The computer of claim 1 wherein:

the network interface is operational to exchange asynchronous transfer mode communications and internet communications with the network connection and wherein the communications processing system is further operational to control the exchange of the asynchronous transfer mode communications and internet communications with the network connection;

the telephone interface is further operational to exchange analog telephone signals with the telephone connection and wherein the communications processing system is further operational to control the exchange of the analog telephone signals with the telephone connection; and the computer interface is further operational to exchange the internet communications with the bus interface and wherein the communications processing system is further operational to control the exchange of the internet communications with the bus interface.

21. The computer of claim 1 wherein the bus interface is a peripheral component interconnect or a small computer system interface.

* * * * *